June 14, 1949.   F. L. BROWN ET AL   2,472,787
FLOW REGULATOR
Filed Aug. 24, 1945
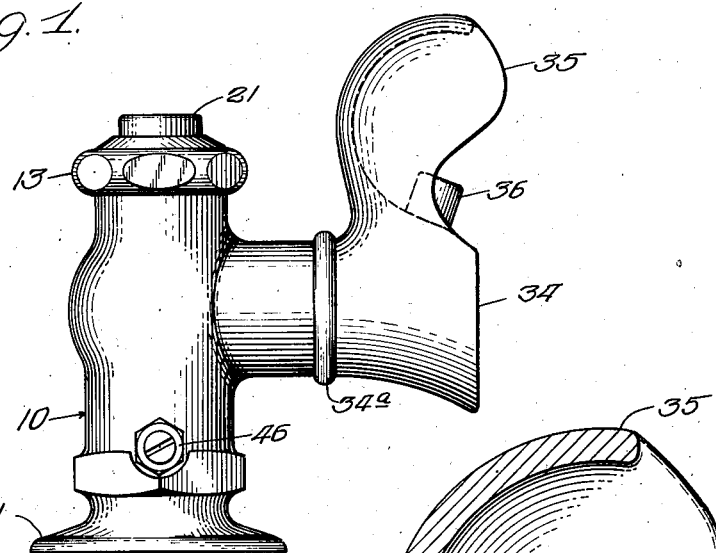
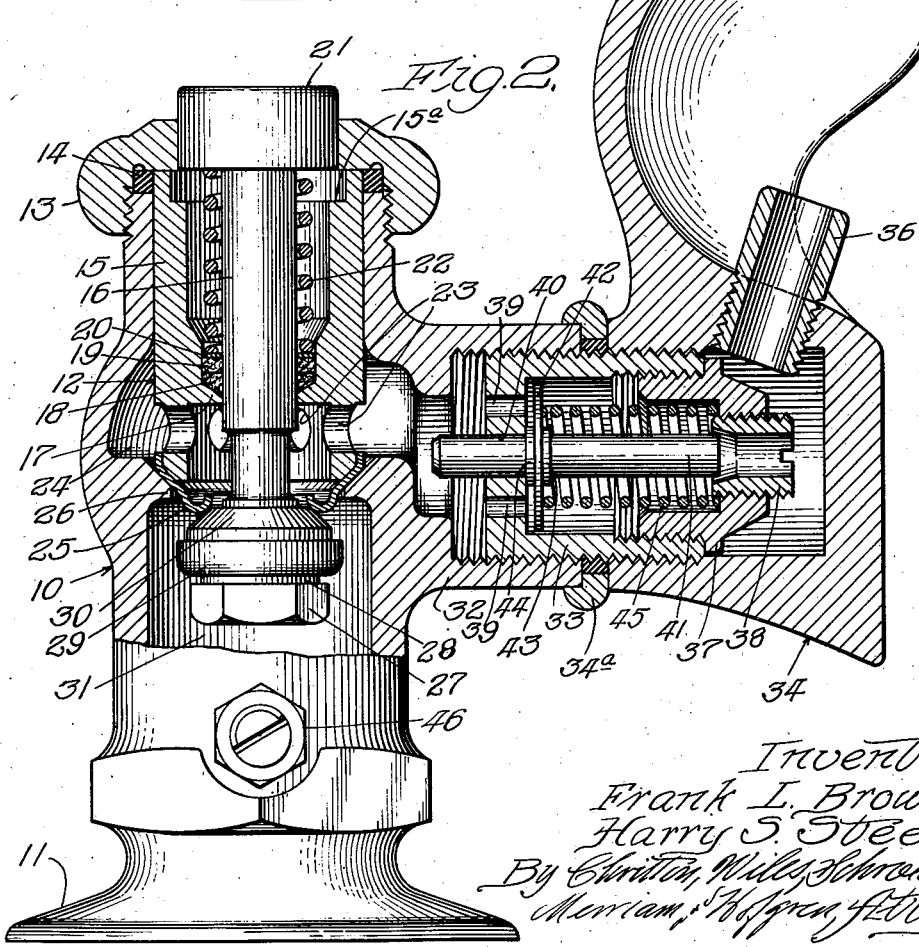
Inventor:
Frank L. Brown,
Harry S. Steer,
By their Attorneys Patented June 14, 1949

2,472,787

UNITED STATES PATENT OFFICE 2,472,787

FLOW REGULATOR

Frank L. Brown, Park Ridge, and Harry S. Steen, Chicago, Ill., assignors to Chicago Faucet Company, a corporation of Illinois Application August 24, 1945, Serial No. 612,320

2 Claims. (Cl. 137—152)

The present invention relates to a flow regulator, and more particularly to a device for stabilizing the flow of fluid.

An object of the invention is to provide automatic means for maintaining a constant flow of fluid at a point. In the embodiment of the invention described in the drawings the flow is of water in a drinking fountain, but that is merely illustrative of a use to which the invention may be put.

In drinking fountains of the bubbler type, it is most important that the flow or stream of water, called a "mound," be maintained at a certain height. If the flow is less, it is difficult to drink from the fountain, and if it is more the person drinking and neighboring objects are likely to become wet or splashed. Inasmuch as the water pressure in the pipe to which the fountain is attached is never constant the flow from the fountain and the height of the mound always varies.

Some efforts have been made to stabilize this flow by means of a piston which regulates the flow by diverting a portion of the water flowing through the device to the drain. This, of course, is wasteful and furthermore requires frequent adjustment because the mechanical friction or drag resulting from the use of a piston varies with wear, temperature, and other conditions.

The present invention not only permits full use of all fluid flowing to it, but has so little mechanical friction or drag as to be most accurate and requires substantially no adjustment after having been once properly installed.

Further objects, advantages and features of the invention will be apparent from the following specification and drawings, in which:

Fig. 1 is a side elevational view of a drinking fountain provided with an embodiment of the invention, and Fig. 2 is an enlarged view of the fountain shown in Fig. 1 with the major part of the device in vertical cross section.

In the embodiment of the invention shown in the drawings, the fountain comprises a hollow casing 10 provided with a base 11 adapted to be secured to a fixture, such as a water cooler, by means of internal threads, not shown, which cooperate with threads on the end of a fluid supply pipe in the fixture in the usual manner.

A removable valve member 12 is secured in the upper part of the casing 10 by means of a nut 13 threaded to the upper end of the casing, a washer 14 making the connection fluid tight. The valve member 12 comprises a cylindrical sleeve 15 in which a stem 16 is longitudinally or axially slidable. The sleeve 15 has an inwardly extending flange 17 forming a restricted opening for the stem 16. Around the stem and above the flange 17 are two packing members 18 and 19 to prevent leakage and a washer 20. Mounted on the top of the stem and integral therewith is a push button 21 and between the button and the washer 20 is a spring 22 which normally urges the button upwardly to the position shown in the drawings. Downward movement of the button is limited by the shoulder 15a in the upper part of the sleeve.

Below the flange 17 the sleeve 15 is provided with a plurality of openings 23 whereby the interior of the sleeve communicates with an enlarged part or chamber 24 in the casing 10. A valve seat member 25 of sheet material, such as brass, is removably attached to the lower end of the sleeve 15 and is adapted to rest on an inwardly extending flange 26 on the casing 10.

Secured to the bottom of the stem 16 by a nut 27 and washer 28 is a retainer 29 on which is mounted a washer or valve member 30 adapted to contact the valve seat 25 and control the flow of fluid from the lower chamber 31 of the casing. The valve 30 and valve seat member 25 also, by their engagement, prevent the stem from moving upwardly above the position shown in the drawings.

The casing 10 is also provided with a hollow cylindrical extension 32 on one side. This extension is internally threaded to receive the base portion of a cup-shaped member 33 on the other end of which is threadedly mounted the fountain member 34 provided with the usual guard 35 and fountain tube 36. An annular sealing member 34a lies between the member 34 and the extension 32 on the casing. The open end of the member 33 is internally threaded to receive another cup-shaped member 37 in the base of which is threaded an adjustable hollow orifice member 38, the inner end of the bore of which is flared as shown in Fig. 2. The two cup-shaped members together comprise the casing of the flow stabilizer unit per se.

The base of the member 33 is provided with a plurality (as 4) of orifices 39, and a central opening 40 in which is axially slidable a metering pin 41 which, as shown, extends through the base of the member 33 to a point adjacent the orifice member 38, to act as a valve member cooperating therewith, and on which is secured a disk 42 with projections 43 and 44. A spring 45 surrounding the pin 41 normally urges the pin toward the position shown in Fig. 2 in a direction tending to increase the effective orifice or opening through the orifice member. The cup-shaped members and parts therein provide a flow regulating unit, insertable into any flow system as a unit, comprising greatly improved automatic flow regulating means.

The operation of the device will now be described. Pressure on the button 21 lowers the stem 16 and valve 30 to permit flow of fluid between the valve 30 and valve seat 25 through the openings 23 to the chamber 24 and thence to the extension 32 where it flows through the orifices 39 and against the surface of the disk 42 and thence around the edges thereof to the interior of the member 33, then through the opening between the pin 41 and member 38 to the fountain tube 36. As the pressure of the water in the supply pipe varies the disk and pin will be moved back and forth and the size of the opening between the end of the pin 41 and the walls of the orifice member 38 will likewise vary in such manner that the pressure at the tube 36 will remain constant. Should the water pressure drop the pin will move to the left and increase the size of the orifice at the member 38 so that more fluid may flow therethrough and maintains the pressure at the tube 36, and hence the height of the fluid or "mound" will remain the same. Should the pressure in the supply pipe increase, the disk and pin will be moved to the right, restricting the size of said orifice, but maintaining the same amount of flow therethrough.

It will be noted that the only source of friction or drag on the pin is the short space that it is journaled in the opening in the base of the cup-shaped member 33 and that the disk 42 does not contact the interior of this member. Furthermore, the pin may be rather loosely fitted in the opening 40 as there is no necessity of maintaining any liquid seal.

It has not been ascertained whether the fluid moves the disk and pin by kinetic energy alone, or by a combination of water pressure and kinetic energy. It is believed that some kinetic energy results from the fluid flowing through the orifice 39 and striking the disk 42 and from the speeding up and "dragging effect" of the fluid as it passes through the restricted opening between the disk 42 and the interior surface of the member 33. Whatever the correct theory, however, it is known from operation of the device that the fluid moves the disk and pin in a manner compensating for variation in pressure in the supply line, at least within the limits normally encountered in practice.

The usual range of pressure in a water cooler is 20 to 40 pounds per square inch. The orifice member 38 is, therefore, adjusted at the factory for proper flow at 20 pounds per square inch with all other flow controls wide open. The casing 10 moreover is supplied with a valve adjacent the point of juncture with the supply line to regulate the water flowing to the casing. This valve is well known to the art and need not be described or shown in detail. It is controlled by a nut 46 on the outside of the casing.

When the fountain is installed the service man can usually regulate the flow out the tube 36 or the height of the "mound" by adjustment of this nut 46. In unusual cases it may be necessary to remove the fountain member 34 and adjust the orifice member 38, but this is not normally necessary. After the "mound" has once been adjusted to the proper height, the flow regulator of the present invention will maintain said height and stabilize flow automatically during all normal variations in the pressure in the supply pipe.

It is apparent that the invention while shown and described in connection with a drinking fountain is not limited thereto, but may be inserted between any two flow points where it will automatically stabilize the flow at the point of flow exit, and that it is capable of many modifications. Changes, therefore, in the construction and arrangement may be made without departing from the spirit and scope of the invention as disclosed in the appended claims.

We claim:

1. A device for minimizing variations in the flow of liquid in a conduit subject to variations in supply pressure, comprising a control unit adapted to be inserted in said conduit to control the flow therethrough and having a passageway therethrough including a cylindrical portion, a first wall adapted to extend completely across said conduit in the end toward the inlet of the conduit, said wall having a central guiding orifice and a plurality of flow orifices therethrough; a removable second wall opposite said first wall and having a single central control orifice, said orifice having a conical portion tapering away from said first wall and opening into a cylindrical portion; a pin of greater length than the distance between said walls and extending into and movable in said guiding and control orifices, said pin having a close but removable fit in said guiding orifice and having a loose fit in the cylindrical portion of said control orifice; a disk fixed on said pin and so related to said flow orifices as to be subject to and moved by the kinetic energy of liquid flowing therethrough at all times during flow, there being substantial clearance between said disk periphery and the wall of the cylindrical portion of the passageway; and a spring urging said pin and disk toward said first wall.

2. A control unit of the character claimed in claim 1, wherein said second wall has a movable central portion having said control orifice therein.

FRANK L. BROWN.
HARRY S. STEEN.

REFERENCES CITED

The following references are of record in the file of this patent:

UNITED STATES PATENTS

| Number | Name | Date |
| --- | --- | --- |
| 474,063 | Lungren | May 3, 1892 |
| 780,986 | Francis | Jan. 31, 1905 |
| 1,019,162 | Keith | Mar. 5, 1912 |